(12) United States Patent
Kusumoto (10) Patent No.: US 6,760,183 B2
(45) Date of Patent: Jul. 6, 2004

(54) SERVO SYSTEM WITH RUNOUT COMPENSATION FOR DISK DRIVE

(75) Inventor: Tatsuharu Kusumoto, Higashiyamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 352 days.

(21) Appl. No.: 09/955,096

(22) Filed: Sep. 19, 2001

(65) Prior Publication Data

US 2002/0034037 A1 Mar. 21, 2002

(30) Foreign Application Priority Data

Sep. 21, 2000 (JP) ........................................ 2000-287381

(51) Int. Cl.$^7$ ............................................... G11B 5/596
(52) U.S. Cl. ........................ 360/77.04; 360/75; 360/69
(58) Field of Search ............................... 360/75, 77.04; 369/43

(56) References Cited

U.S. PATENT DOCUMENTS

| | | | |
|---|---|---|---|
| 4,616,276 A | | 10/1986 | Workman |
| 5,521,773 A | * | 5/1996 | Suzuki et al. ............ 360/77.04 |
| 6,310,742 B1 | * | 10/2001 | Nazarian et al. ......... 360/77.04 |
| 6,522,495 B1 | * | 2/2003 | Lamberts et al. ........ 360/77.04 |

FOREIGN PATENT DOCUMENTS

| | | |
|---|---|---|
| EP | 0 308 069 | 3/1989 |
| EP | 0 547 630 A2 | 6/1993 |
| JP | 4-307482 | 10/1992 |
| JP | 4-368681 | 12/1992 |
| JP | 5-274826 | 10/1993 |
| JP | 6-103712 | 4/1994 |
| JP | 8-315529 | 11/1996 |
| JP | 11-39814 | 2/1999 |
| JP | 11-353831 | 12/1999 |

* cited by examiner

Primary Examiner—David Hudspeth
Assistant Examiner—Daniell L Negron
(74) Attorney, Agent, or Firm—Pillsbury Winthrop LLP (57) ABSTRACT

A disk drive including a servo system that performs a learning operation for calculating a servo compensation value is disclosed. The servo system determines whether an initial learning value stored in a flash memory in advance is valid or invalid. When the initial learning value is valid, the servo system inhibits a normal learning operation from being performed. When the initial learning value is invalid, the servo system calculates a servo compensation value using the present learning value obtained by performing the learning operation.

11 Claims, 7 Drawing Sheets

SERVO SYSTEM WITH RUNOUT COMPENSATION FOR DISK DRIVE

CROSS-REFERENCE TO RELATED APPLICATIONS

This application is based upon and claims the benefit of priority from the prior Japanese Patent Application No. 2000-287381, filed Sep. 21, 2000, the entire contents of which are incorporated herein by reference.

BACKGROUND OF THE INVENTION

1. Field of the Invention

The present invention generally relates to a disk drive including a servo system and specifically to a servo system having a disk runout compensation function.

2. Description of the Related Art

A prior art disk drive such as a magnetic disk drive includes a servo system for locating a magnetic head (simply referred to as a head hereinafter) in a target position (target track or target cylinder) on a disk using servo data prerecorded on the disk. The servo system includes a feedback system using a microprocessor (CPU) as a main element, the microprocessor being a main controller of the disk drive.

The manufacturing process of a disk drive includes a servo-write step of recording servo data on a disk. In the servo-write step, a drive mechanism such as a head disk assembly is incorporated into the body of the drive and then servo data is recorded on the disk by a servo track writer (STW). As another method, servo data is prerecorded on the disk before the disk is incorporated into the drive body.

Servo data is recorded on a plurality of servo areas of the disk, which are arranged at regular intervals along the circumference of the disk. In each track, an area between adjacent servo areas is a data area. The data area is divided into a plurality of data sectors (access unit of data). A range from one servo area to its subsequent data sectors is called a servo sector. One track of the disk is a set of servo sectors for one round. There may be cases where a track defined by only servo areas is called a servo track and a track defined by a set of servo sectors is called a data track.

Thus, a number of tracks are formed concentrically on the disk. Such tracks may be called a cylinder under the concept that it includes tracks in the same position in the direction of rotation axis of one or a plurality of disks (the same position of the face and back when the number of disks is one). It is preferable that each of the tracks be formed as an almost perfect circle with reference to the rotation axis of the disk.

In the servo-write step using an STW, however, an external impact is given to the drive body and an influence is exerted upon the mechanical accuracy of a clamp mechanism for fixing the disk. These factors cause a phenomenon called a disk runout. The disk runout can be measured as an amount of rotation-runout or eccentricity that is caused in synchronization with the period of rotation of the disk. Due to the disk runout phenomenon, the servo tracks are not formed as an idealistic concentric circle but deformed with regard to the rotation center of the disk.

In the above disk drive, the servo system drives an actuator to locate the head in a target track on the disk when it reads/writes data. The servo system chiefly perform a seek operation for moving the head to a target track and a tracking operation for positioning the head within the range of a target track (usually on the center line of the track). In the tracking operation, the servo system follows servo data read out of the head. Actually, the servo system reads servo burst data contained in servo data and generates a positional-error signal. In response to the positional-error signal, the servo system adjusts the head onto the center line of the track. If, therefore, the servo data is greatly distorted due to a deformation of the servo track, the tracking operation becomes difficult to perform in normal feedback control.

Recent disk drives comprise a servo system having a learning function of calculating a disk runout component when a spindle motor for rotating the disk is started and performing servo compensation based on a result of the calculation (disclosed in, e.g., Jpn. Pat. Appln. KOKAI Publication No. 11-353831). The servo system obtains a disk runout component (referred to as a learning value hereinafter) from a positional error of a head. The servo system calculates and stores a learning value for each head through a learning operation and executes servo compensation in a tracking operation using the learning value. More specifically, the servo system obtains a servo compensation value (correction value) for suppressing a disk runout from a learning value of each head calculated by the learning operation. The servo system adds the servo compensation value to a control value obtained by feedback control. This addition is performed by feed-forward control. If the servo system has a learning function, it can inhibit the head from being deformed in the tracking operation, thereby improving the accuracy of head positioning.

In a disk drive having a learning function, a learning value calculated by a learning operation performed when the disk drive is manufactured (hereinafter referred to as an initial learning value) is stored in a nonvolatile memory such as a flash ROM and an EEPROM. When a spindle motor is started, the servo system of the disk drive carries out a learning operation in which the initial learning value stored in the memory is used as an initial value. Usually, the servo system stores a learning value obtained by the learning operation in a DRAM (dynamic RAM) and uses the learning value in the subsequent servo control operation (head positioning control). The DRAM clears the stored learning value when the drive turns off.

In the disk drive having a servo system, a learning operation is performed whenever the spindle motor starts, so that a data read/write operation is always on standby until the learning operation ends. Consequently, the starting time of the drive (time for preparing the read/write operation) is relatively long. Disk drives have recently been widely used for mobile information equipment having a communications function as well as personal computers. The reduction of starting time is a challenge to improve the performance of the disk drives.

Conventionally, if a proper learning value is not obtained by a learning operation when a disk drive starts, the initial learning value calculated when the drive is manufactured is used. However, due to a change of use environment (particularly temperature) of disk drives, an amount of eccentricity of a disk may be changed after the disk drive is manufactured. The use of the initial learning value causes the drive to malfunction when it starts.

BRIEF SUMMARY OF THE INVENTION

An object of the present invention is to shorten time for performing a learning operation related to disk runout compensation and thus shorten time for preparing a read/write operation.

According to an aspect of the present invention, a disk drive has a learning function of determining whether an initial learning value calculated by a learning operation when the drive is manufactured is valid or not when a spindle motor of the drive starts and omitting a learning operation when the initial learning value is valid.

More specifically, the disk drive comprises a disk on which servo data is prerecorded, a head configured to read/write data, an actuator mounted with the head and configured to locate the head in a target position on the disk, a servo controller configured to perform a seek operation and a tracking operation and locate the head in the target position on the disk, a first memory configured to store an initial learning value, a learning controller configured to stop the learning operation when the initial learning value is valid and perform the learning operation when the learning value is invalid, and a second memory configured to store a learning value calculated by the learning operation of the learning controller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

A plurality of embodiments of the present invention will now be described with reference to the accompanying drawings.
(Configuration of Disk Drive)

Figure 1:
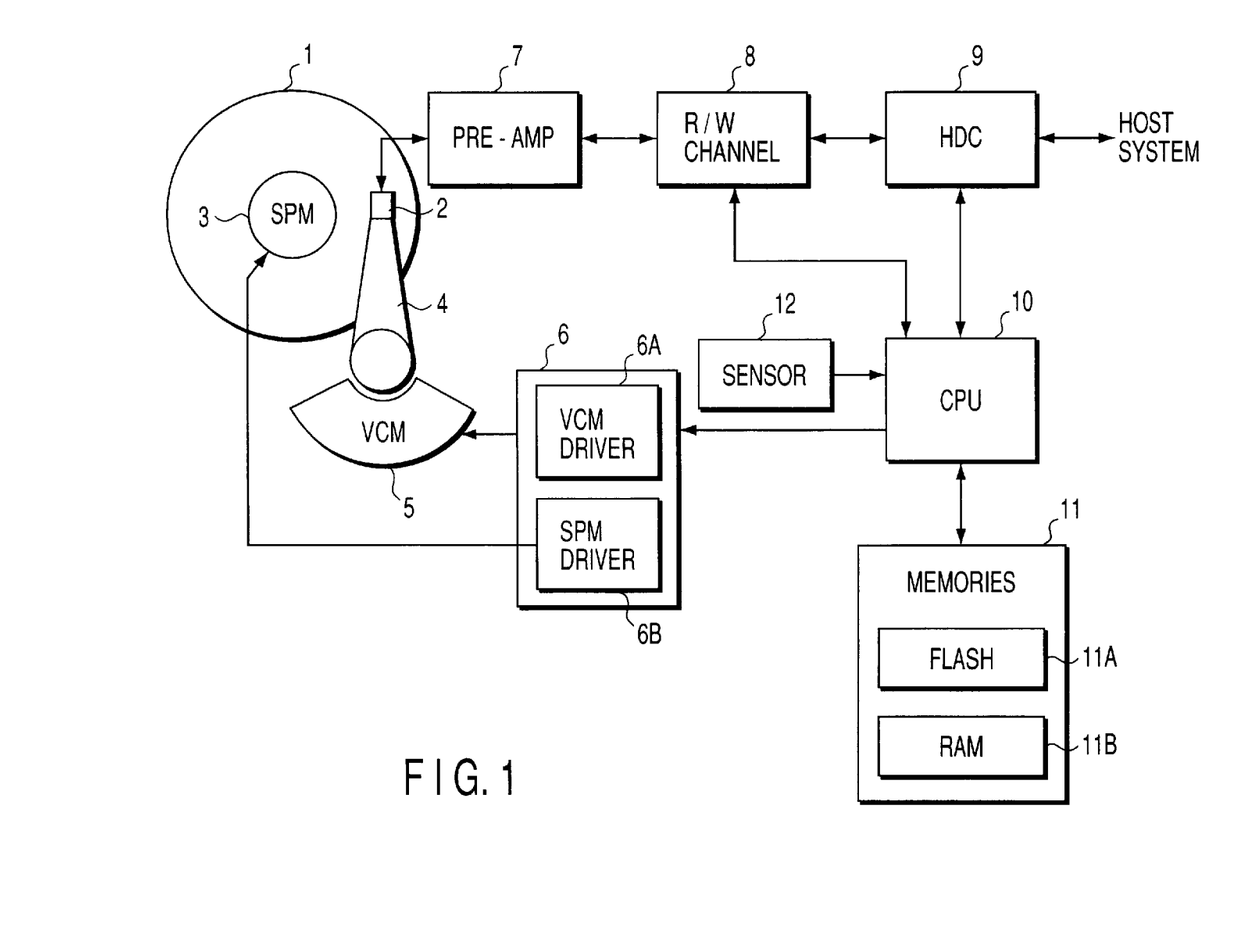
FIG. 1 is a block diagram showing a major part of a disk drive according to each of first to sixth embodiments of the present invention.

A disk drive, which is directed to each of the embodiments described later, comprises a disk 1 that is a data recording medium and a magnetic head 2 for reading/writing data from/to the disk 1, as shown in FIG. 1. A spindle motor (SPM) 3 rotates the disk 1 at high speed. Servo data used for positioning the head 2 in a target track (or target cylinder) is prerecorded on the disk 1. The disk 1 has a number of concentric tracks (data tracks including data sectors) thereon. Each of the tracks contains servo areas in which servo data items are recorded at regular intervals.

In the head 2, a read-head element and a write-head element are mounted on a slider of a head body separately from each other. The head 2 is mounted on an actuator 4 driven by a voice coil motor (VCM) 5. The number of disks is one and the number of heads is two corresponding to both faces of the disk 1 for the sake of convenience here.

The VCM5, which is an object to be controlled in a servo system in a strict sense, is supplied with a drive current from a VCM driver 6A included in a motor driver IC6. The motor driver IC6 includes an SPM driver 6B for supplying a drive current to the SPM 3 as well as the VCM driver 6A. The motor driver IC6 is controlled by a microprocessor (CPU) 10, which will be described later.

The disk drive further comprises a circuit system including a head amplifier (preamplifier) circuit 7, a read/write (R/W) channel 8, a disk controller (HDC) 9, a CPU 10, a memory 11, and a sensor 12 as well as the above-described head disk assembly.

The head amplifier circuit 7 switches the heads 2 to each other and transmits/receives a read/write signal to/from the heads 2. The R/W channel 8 is a signal processing circuit for processing the read/write signal. The channel 8 has a function of reproducing servo data from the read signal and supplying it to the CPU 10. The HDC 9 has an interface function of controlling a command between the drive and the host system and communications of read/write data and a disk controller function of controlling communications of read/write data between the HDC 9 and the R/W channel 8.

The CPU 10 is a main controller of the disk drive and also a main element of the servo system. The CPU 10 performs control operations related to a head positioning operation, a learning operation, and a servo compensating operation, which are main functions of the servo system. The memory 11 is a rewritable memory such as a flash EEPROM and includes a nonvolatile flash memory 11A and a dynamic RAM (simply referred to as RAM hereinafter) whose storage contents are cleared when power is turned off. The flash memory 11A stores an initial learning value calculated by a learning operation when the drive is manufactured. The RAM 11B stores a learning value calculated by a learning operation when the drive is started after shipment. The RAM 11B also serves as a memory for temporarily storing an initial learning value as a working memory of the CPU 10.

The disk drive also comprises a temperature sensor 12 for sensing temperature variations of the drive. The CPU 10 receives a sense signal from the temperature sensor 12 to monitor the temperature variations of the body of the drive.
(Servo System)

The servo system, which includes the CPU 10 as a main element, is incorporated into the disk drive. The disk drive reads/writes data from/to a data sector to be accessed, which is contained in a target track on the disk 1, in response to a read/write command from the host system. The servo system drives the actuator 4 (actually VCM 5) in order to position the head 2 in a target track on the disk 1 in the read/write operation. The servo system employs servo data read out of a servo area on the disk 1 by the head 2 to perform a servo control operation including both a seek operation and a tracking operation.

The servo system carries out a seek operation for moving the head 2 to the target track under the control of speed. The servo system shifts the seek operation to a tracking operation to position the head 2 within a target track (on the center line of the track). Conceptually, the servo system includes a feedback control system and a feed-forward control system for making servo compensation by adding a servo compensation value to a control value of the feedback control system.

As described above, when a disk runout occurs in a servo track (including servo sectors) on the disk, the tracking operation does not succeed only by the tracking control for servo data. Thus, the servo system obtains a servo compensation value (correction value) using the initial learning value or the learning value (disk runout component) calculated by the learning operation and executes servo compensation for the tracking operation. In other words, the servo system includes a servo controller for carrying out a servo control operation and a learning controller for performing or stopping the learning operation.

(First Embodiment)

Figure 2:
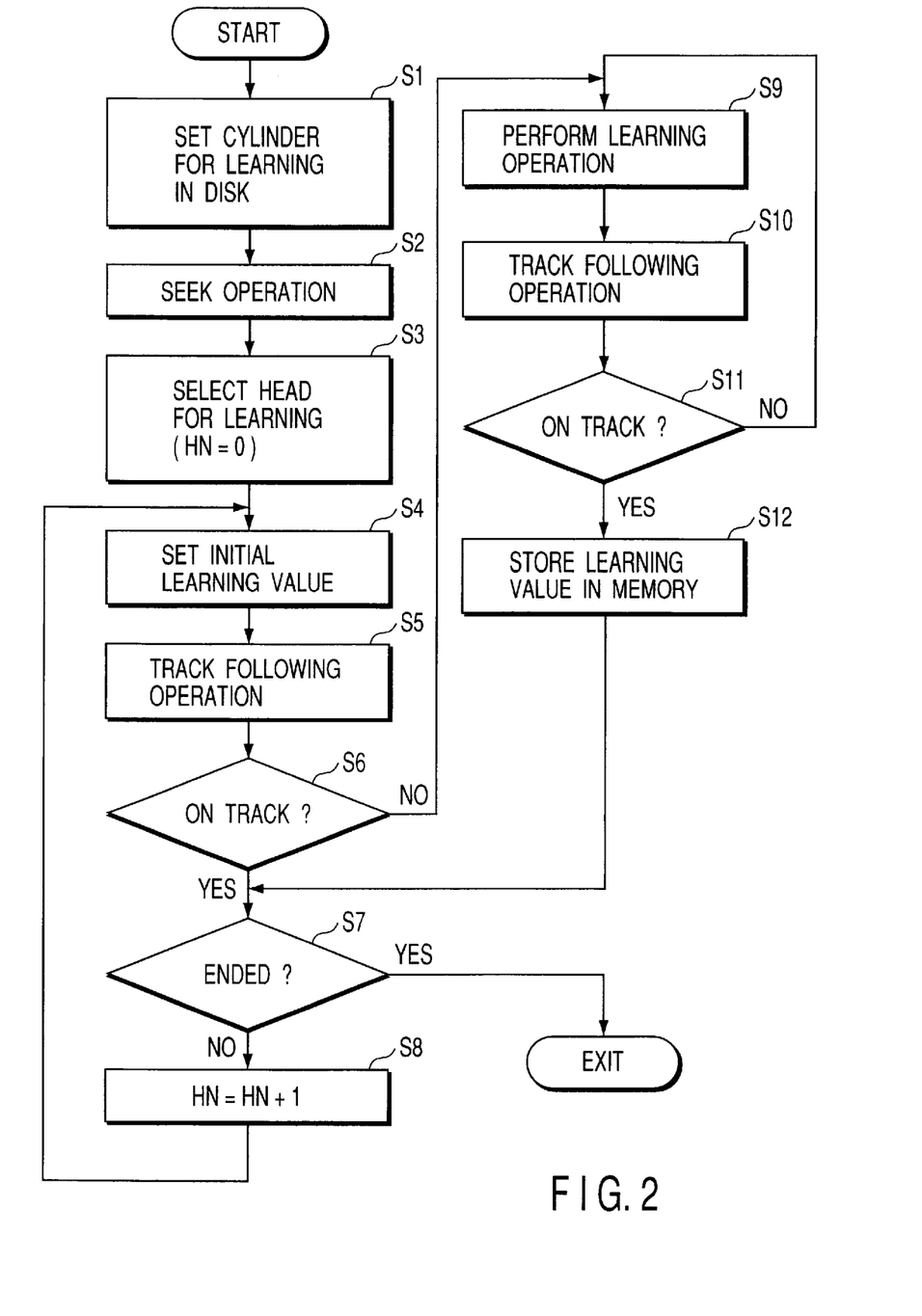
FIG. 2 is a flowchart explaining steps of a learning operation according to the first embodiment of the present invention.

A learning operation according to a first embodiment of the present invention will now be described with reference to FIG. 1 and the flowchart of FIG. 2.

The power of a disk drive is turned on. When the spindle motor 3 starts and reaches a given number of stationary revolutions, the servo system (CPU 10) sets a learning cylinder as a target position and drives the actuator 4 to perform a seek operation (steps S1 and S2). Since, in the first embodiment, a learning operation is performed for a plurality of heads 2, a track may be called a cylinder for the sake of convenience.

When the actuator 4 arrives at the learning cylinder, the CPU 10 selects a first-learning head 2 (whose head number HN is defined as 0) (step S3). In this embodiment, the number of disks is assumed to be one. The head (head number HN=0) on the face of the disk 1 and the head (head number HN=1) on the back thereof are mounted on the actuator 4.

The CPU 10 reads an initial learning value corresponding to the head (head number HN=0) from the flash memory 11A and sets it in a working memory of the RAM 11B (step S4). The CPU 10 performs a tracking operation to position the head within a target track of the learning cylinder (step S5). Then, the CPU 10 makes servo compensation using the initial learning value stored in the RAM 11B to determine whether the head (head number HN=0) is on track (step S6). In other words, the CPU 10 determines whether the head 2 is positioned on the center line of the target track and can be maintained as it is within a given period of time (determination of whether the tracking operation succeeds or fails).

When the head is on track, the CPU 10 selects the next head (head number HN=1) and repeats the steps S4 to S6 (steps S7, S8). When each of the heads 2 succeeds in on-track, the CPU 10 stops a learning operation and moves to a read/write preparation operation (YES in step S6 and YES in step S7).

When either of the heads 2 fails in on-track, the CPU 10 moves to a learning operation (NO in step S6 and S9). In other words, the CPU 10 performs the learning operation to calculate a disk runout component (learning value) using a positional error of the head calculated by the tracking operation. The CPU 10 obtains a servo compensation value from the learning value calculated by the learning operation, and performs a tracking operation again to make the head follow the target track (learning cylinder) (step S10).

The CPU 10 executes servo compensation using a learning value obtained by the learning operation to determine whether the head 2 is on track or not. If the head succeeds in on-track, the CPU 10 stores the learning value in the RAM 11B (YES in step s11, s12). On the other hand, if the head fails in on-track, the CPU 10 performs a learning operation again and repeats the tracking operation and the on-track determining operation (NO in step S11). However, the learning operation is repeated only by the predetermined number of times and stops if the head does not succeed in on-track.

According to the first embodiment described above, when the drive starts, the servo system performs a tracking operation using the stored initial learning value and inhibits a learning operation from being performed for the head for learning when the head succeeds in on-track. Then, the servo system determines that the initial learning value stored in the flash memory 11A is valid. As a result of determination, the servo system does not perform a learning operation during the servo control operation in the read/write mode, but uses the initial learning value stored in the flash memory 11A. In the tracking operation, the servo system obtains a servo compensation value using an initial learning value and performs a tracking operation using the servo compensation value.

When the tracking operation using the initial learning value fails (the head is not on track), it shifts to a learning operation for the head to store the learning value in the RAM 11B. Then, the servo system determines that the initial learning value is invalid and performs a servo control operation using a learning value calculated by the learning operation. In the tracking operation contained in the servo control operation, the servo system obtains a servo compensation value using the learning value stored in the RAM 11B. Thus, the tracking operation is carried out using the servo compensation value.

Actually, the servo system performs a servo control operation using a learning value when the learning value is stored in the RAM 11B. In short, no learning value is stored in the RAM 11B when the initial learning value is valid.

When the initial learning value is valid, all or part of the learning operation for each head is stopped; therefore, time required for the learning operation can be shortened, so can be time required for preparing a read/write operation when the drive is started. When the initial learning value is not valid, a servo control operation using the learning value calculated by the learning operation is carried out. It is thus possible to prevent a situation in which a disk drive is troubled due to the use of an improper initial learning value.

(Second Embodiment)

Figure 3:
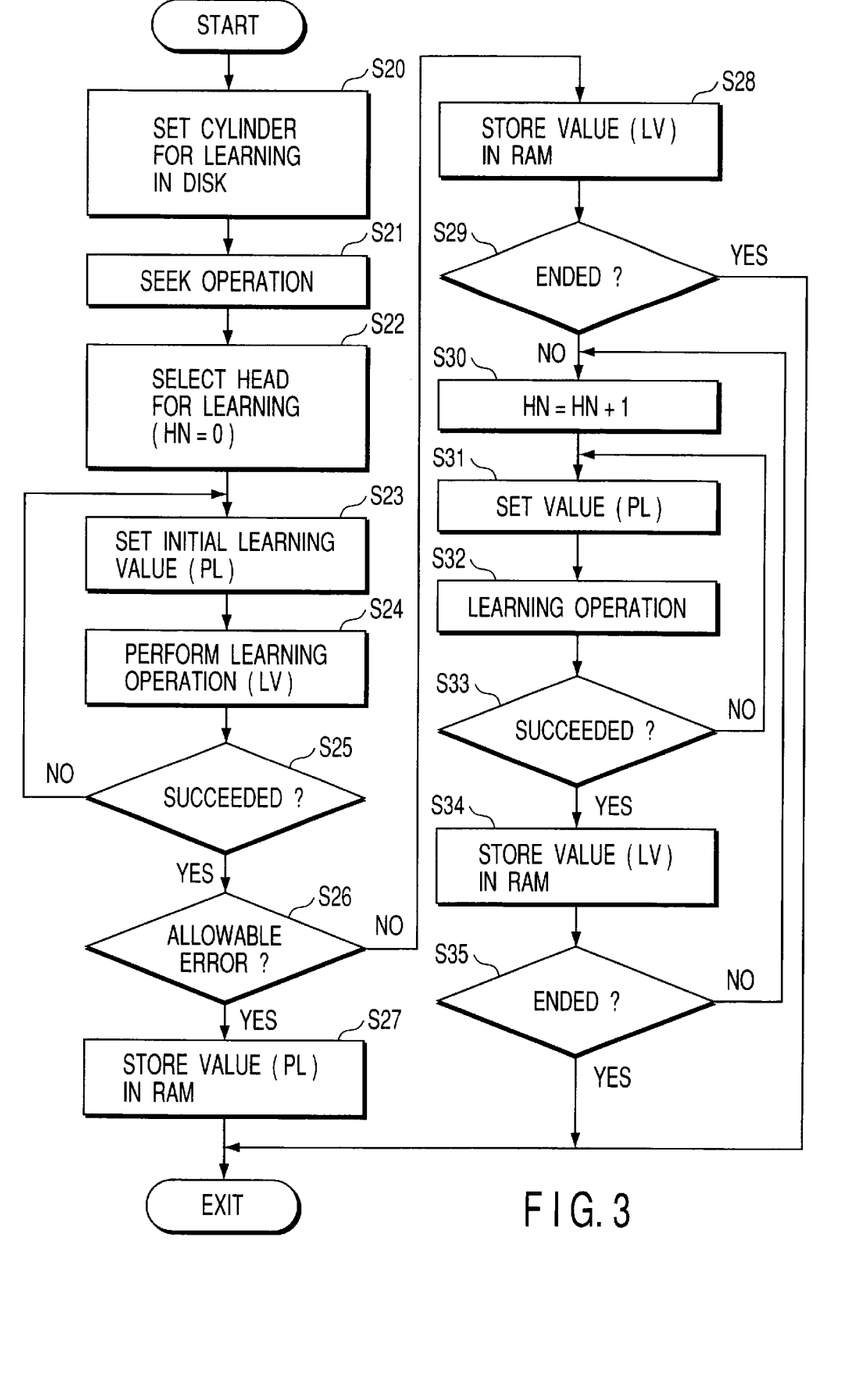
FIG. 3 is a flowchart explaining steps of a learning operation according to the second embodiment of the present invention.

FIG. 3 is a flowchart explaining a learning operation according to a second embodiment of the present invention. The second embodiment is directed to a servo system. The servo system compares the initial learning value calculated by a learning operation performed during the manufacture of a disk drive and the present learning value corresponding to a given head. When a difference between the learning values falls within tolerance (or not larger than a prescribed value), the servo system determines that a variation in disk runout falls within tolerance and uses the initial learning value as a proper one. Referring to the flowchart of FIG. 3, the learning operation will now be described more specifically.

The power of a disk drive is turned on. When the spindle motor 3 starts and reaches a given number of stationary revolutions, the servo system (CPU 10) sets a learning cylinder as a target position and drives the actuator 4 to perform a seek operation (steps S20 and S21).

When the actuator 4 arrives at the learning cylinder, the CPU 10 selects a first-learning head 2 (whose head number HN is defined as 0) (step S22). The CPU 10 reads an initial learning value (defined as PL) corresponding to the head (head number HN=0) from the flash memory 11A and sets it in a working memory of the RAM 11B (step S23). The CPU 10 performs a learning operation corresponding to the selected head (head number HN=0) using the initial learning value and calculates a learning value (defined as LV) corresponding to a disk runout component at the present time (step S24).

The CPU 10 determines whether the calculated learning value (LV) is proper or not (whether the learning operation succeeds or not). More specifically, the CPU 10 executes servo compensation using the learning value (LV) to determine whether the head (head number HN=0) can be tracked on the learning cylinder (step S25). When the learning operation fails, a learning operation corresponding to the head (head number HN=0) is performed again (NO in step S25).

When the learning operation succeeds, the CPU 10 compares the learning value (LV) at the present time and the initial learning value (PL) at the time of manufacture and determines whether a difference between the values is not higher than a specified value (within tolerance or out of tolerance) (step S26). If a determination result falls within tolerance, the CPU 10 determines that no disk runout varies but the initial learning value (PL) at the time of manufacture is proper, and stores the respective learning values (PL), which correspond to all the heads (two heads in this embodiment) including the head (head number HN=0), in the RAM 11B (step S27).

If a determination result goes out of tolerance, the CPU 10 determines that the present-time learning value (LV) is proper because disk runout varies after the manufacture and stores it in the RAM 11B (step S28). The CPU 10 also performs a normal learning operation corresponding to the head (head number HN=1) other than the head (head number HN=0) and stores the calculated learning value (LV) in the RAM 11B (steps S29 to S34). When the learning operation fails, a learning operation corresponding to the head (head number HN=1) is performed again (NO in step S33). The above learning operations are performed for all the heads (two heads in this embodiment) mounted on the disk drive and then the calculated present-time learning values are stored in the RAM 11B as proper ones (YES in step S29, YES in step S35).

According to the second embodiment described above, when the disk drive starts, the servo system carries out a learning operation corresponding to a first-learning head and compares the present-time learning value (LV) and the initial learning value (PL) to determine whether a difference between the values is not higher than a specified value (within tolerance or out of tolerance). If a determination result falls within tolerance, no disk runout varies and the CPU 10 determines that the initial learning value (PL) corresponding to each head is valid at the time of manufacture. From then on, a learning operation corresponding to the head (head number HN=1) other than the first head (head number HN=0) is prevented from being carried out. Consequently, time for performing the learning operation can be shortened, so can be time for preparing a read/write operation when the drive starts.

When the CPU determines that the initial learning value is not valid, it performs a normal learning operation corresponding to all the heads, stores the present-time learning value in the RAM 11B, and uses the learning value for servo compensation in the read/write mode. Since, therefore, a learning value calculated by the learning operation is used when the initial learning value is improper, a situation in which a disk drive is troubled due to the use of an improper initial learning value can be prevented.

(Third Embodiment)

Figure 4:
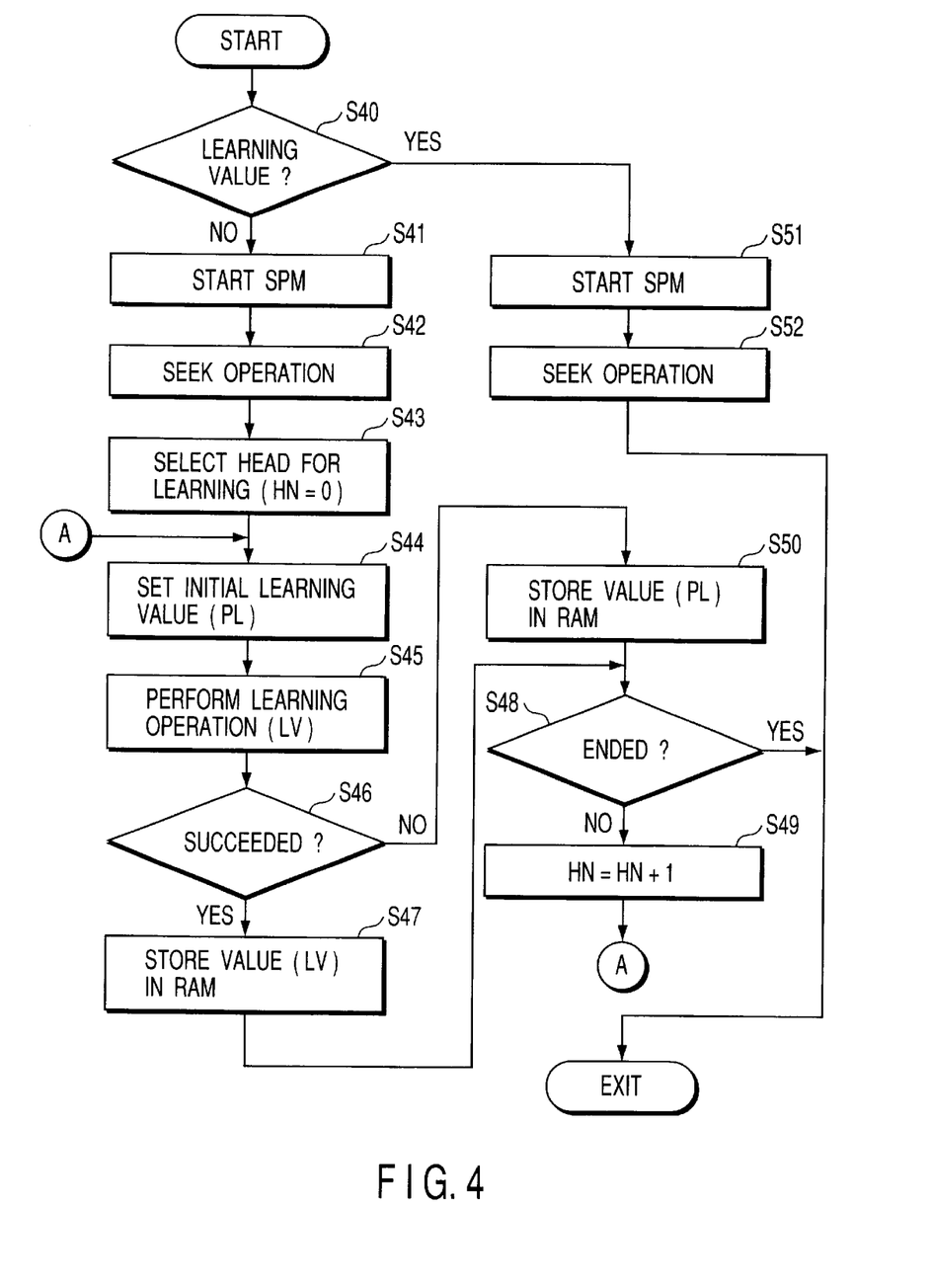
FIG. 4 is a flowchart explaining steps of a learning operation according to the third embodiment of the present invention.

FIG. 4 is a flowchart explaining a learning operation according to a third embodiment of the present invention. The third embodiment relates to a servo system having a function of inhibiting a normal learning operation from being performed if a learning value (a present-time learning value calculated by a learning operation) is stored in the RAM 11B when the spindle motor 3 starts. The learning operation will now be described specifically with reference to the flowchart shown in FIG. 4.

The third embodiment is directed to a system for storing a learning value, which is calculated by a normal learning operation performed immediately after the power of a disk drive turns on, in the RAM 11B. As described above, an initial learning value measured and stored in the flash memory 11A when the disk drive is manufactured is used in the normal operation.

Since the RAM 11B is a nonvolatile memory, the learning values stored therein are erased when the power of the disk drive turns off. However, the RAM 11B stores the learning values during which period power continues to be supplied even when the read/write operation is stopped.

Assuming that a motor start command is issued from the host system, the disk drive starts the spindle motor 3 and shifts to an operation for preparing a read/write operation. Then, the CPU 10 refers to the contents stored in the RAM 11B to determine whether a learning value (or an initial learning value) of each head is present or not before the CPU 10 starts the spindle motor 3 (step S40).

When a learning value corresponding to each head is stored in the RAM 11B, the CPU 10 does not perform a normal learning operation but starts the spindle motor 3 and shifts to a first seek operation when it reaches a given number of stationary revolutions (YES in step s40, steps S51 and S52). After that, the CPU 10 shifts to a read/write operation.

When a learning value corresponding to each head is not stored in the RAM 11B, the CPU 10 shifts to a normal learning operation (NO in step S40). In other words, when the spindle motor is started and a given number of stationary revolutions are obtained, the CPU 10 carries out a seek operation to a learning cylinder set as a target position (steps S41 and S42).

The CPU 10 selects a first-learning head 2 (head number HN=0) when the actuator 4 reaches the learning cylinder (step S43). The CPU 10 reads an initial learning value corresponding to the head (head number HN=0) from the flash memory 11A and sets it in a working memory of the RAM 11B (step S44). Using the initial learning value, the CPU 10 performs a learning operation corresponding to the selected head (head number HN=0) and calculates a learning value corresponding to a disk runout component at the present time (step S45).

The CPU 10 determines whether the calculated learning value is proper or not (whether the learning operation succeeds or not) (step S46). When the learning operation succeeds, the CPU 10 stores the learning value, which is calculated by the learning operation, in the RAM 11B (YES in step S46, step S47). The foregoing learning operation is repeated for all the heads (two heads in this embodiment) (steps S48 and S49).

When the learning operation fails, the CPU 10 stores the initial learning value in the RAM 11B as a learning value corresponding to the head (head number HN=0) (NO in step S46, step S50). Thus, there is a case where both the present-time learning value calculated by the learning operation and the initial learning value calculated at the time of manufacture are mixed and stored in the RAM 11B as learning values for the heads.

According to the third embodiment described above, if a learning value is stored in the RAM 11B when the disk starts to rotate, it is determined as a valid one to stop a normal learning operation and start preparing a read/write operation. Therefore, time required for performing the learning operation can be shortened, so can be time required for preparing the read/write operation. In short, during which period power is continuously supplied to the disk drive, the learning value calculated by the first learning operation is considered to be valid and the learning operation is omitted. Even during this period, it is assumed that a variation in disk runout is small.

When the supply of power to the disk drive is cut off, the learning values stored in the RAM 11A are cleared. Since, therefore, the learning operation is performed at the next starting time, an updated learning value is stored in the RAM 11A. Consequently, a servo control operation using a proper learning value can always be performed even when disk runout varies greatly.

(Fourth Embodiment)

Figure 5:
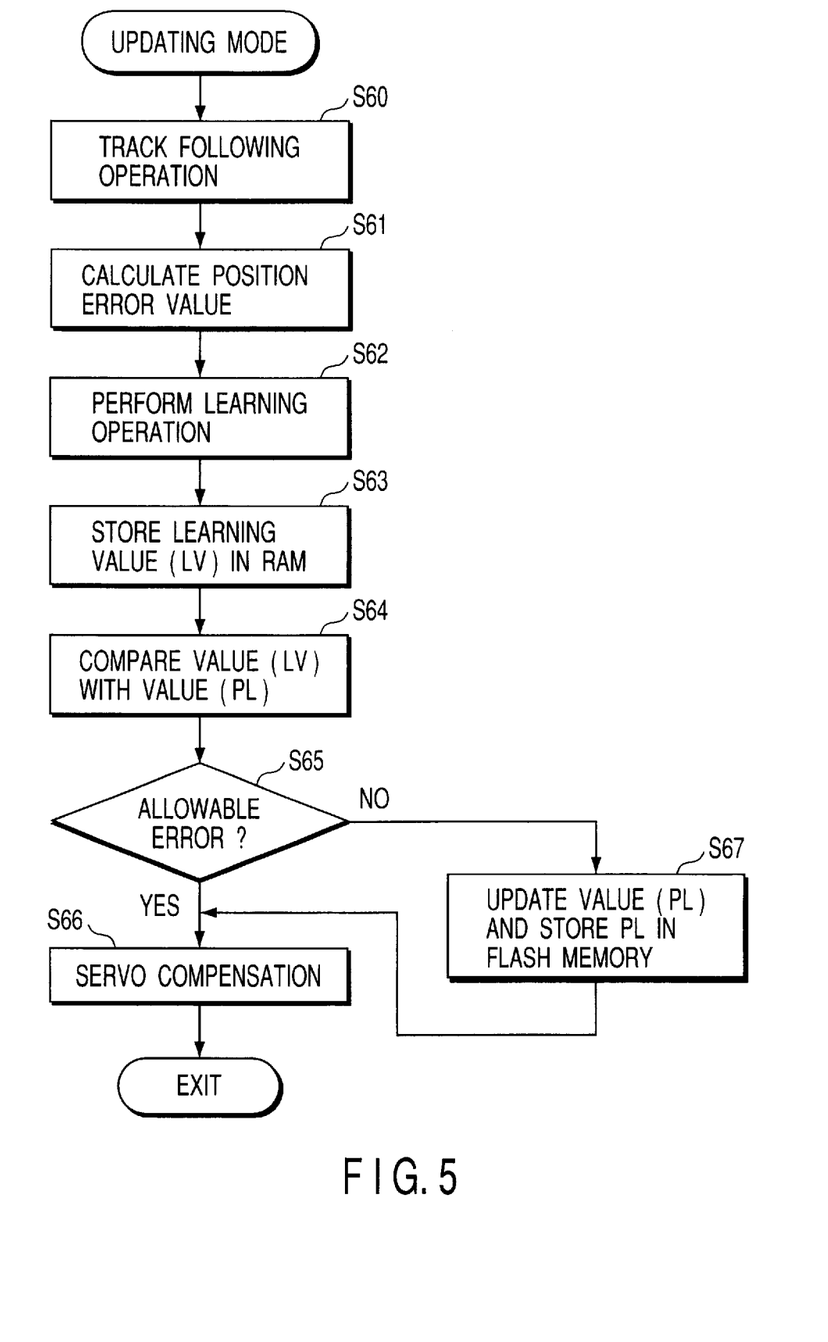
FIG. 5 is a flowchart explaining steps of a learning operation according to the fourth embodiment of the present invention.

FIG. 5 is a flowchart explaining a learning operation according to a fourth embodiment of the present invention. The fourth embodiment relates to a servo system having a learning function of appropriately updating an initial learning value measured and stored in the flash memory 11A when a disk drive is manufactured. The learning operation will now be described specifically with reference to the flowchart shown in FIG. 5.

The fourth embodiment is directed to a servo system having an update mode for updating an initial learning value in accordance with prescribed conditions (e.g., a lapse of fixed time). In the update mode, the CPU 10 performs a learning operation for each of heads to calculate the present-time learning value (LV). More specifically, when a tracking operation is performed for a target cylinder (or a learning cylinder or a read/write cylinder) on a disk, the CPU 10 calculates the present-time learning value (LV) from a positional error (an error in the position of the head to the center line of the track) obtained by a positional-error operation (steps S60 to S62). As in the normal learning operation, the CPU 10 extracts a disk runout component from the positional error and calculates a learning value corresponding to the disk runout component.

The CPU 10 stores the calculated present-time learning value (LV) in the RAM 11B (step S63). Then, the CPU 10 reads the initial learning value (PL), which is obtained at the time of manufacture, from the flash memory 11A and compares it with the learning value (LV) (step S64). The CPU 10 determines whether a difference between the values is not higher than a specified value (within tolerance or out of tolerance). If the difference falls within tolerance, the CPU 10 maintains the initial learning value (PL) as it is. The CPU 10 executes servo compensation in a tracking operation using a learning value stored in the RAM 11B (step S65).

When the difference goes out of tolerance, the CPU 10 determines that the calculated learning value (LV) is proper because disk runout varies after the manufacture and then updates the initial learning value (PL) (step S66). More specifically, the CPU 10 rewrites the learning value (LV), which is calculated for each head at the present time, as a new initial learning value (PL) stored in the flash memory 11A.

According to the fourth embodiment described above, in the update mode, the CPU determines whether the initial learning value (PL) is valid or not by comparing the learning value (LV) calculated by the learning operation at the present time and the initial learning value (PL). If a determination result goes out of tolerance and the initial learning value is not valid, it is updated using the present-time learning value (LV). Consequently, a proper initial learning value can always be maintained by appropriately updating the initial learning value, which is set during the manufacture, with the passage of time.

In the case where the learning operation, which is performed when the disk starts to rotate, fails, the CPU 10 cannot store the present-time learning value (LV) in the RAM 11B. In this case, the CPU 10 calculates a servo-compensation value in the tracking operation using the initial learning value stored in the flash memory 11A as an alternative. Since the initial learning value stored in the flash memory 11A is updated within a fixed period of time, it can be considered to be close to a learning value that can be assumed at the present time. Consequently, servo compensation can reliably be achieved if an appropriate initial learning value is used as an alternative even when the learning operation fails.

In other words, a situation in which the disk drive is troubled due to the use of an inappropriate initial learning value can be prevented. The initial learning value is used as an initial value during the learning operation; therefore, if the initial learning value is an updated appropriate one, time for performing the learning operation can be shortened, as can be time for preparing the read/write operation when the drive starts to operate.

(Fifth Embodiment)

Figure 6:
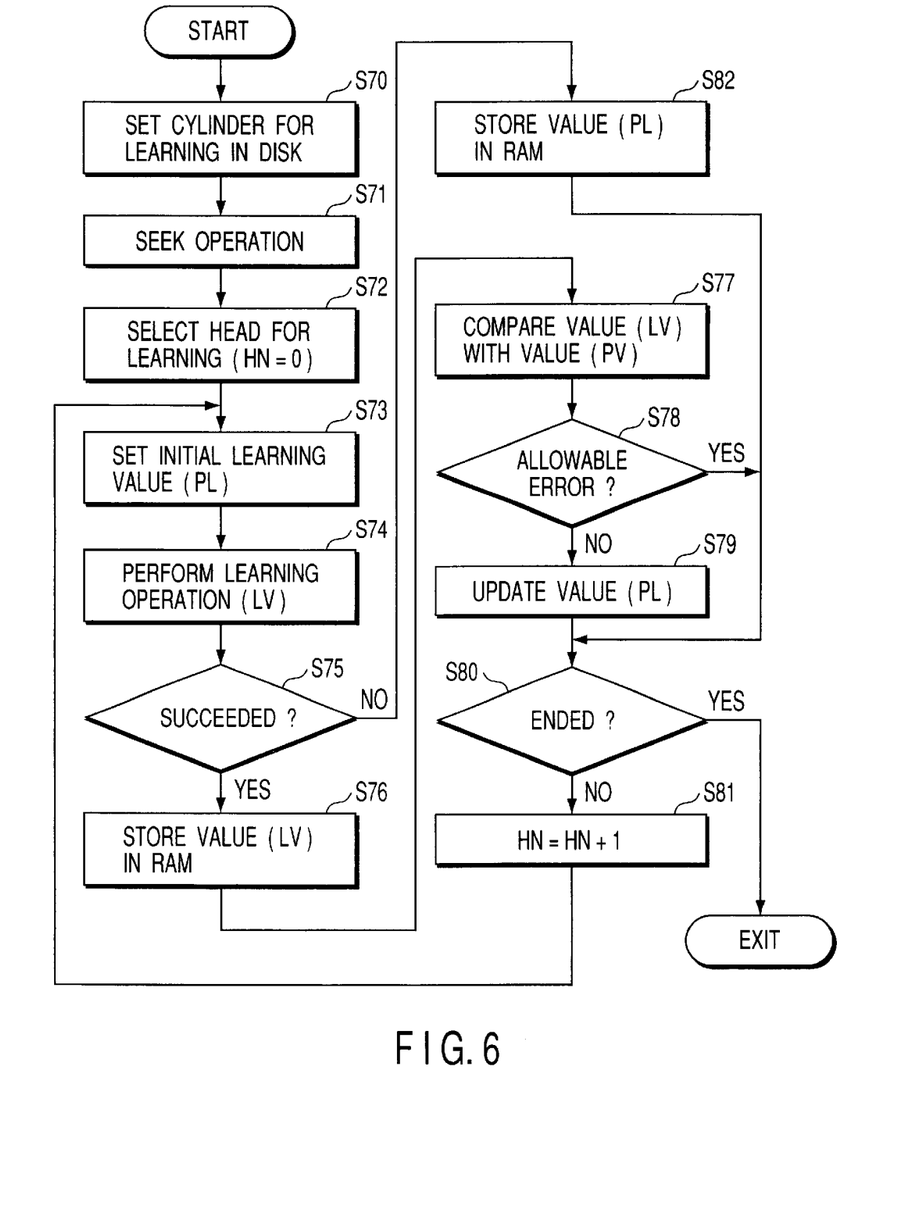
FIG. 6 is a flowchart explaining steps of a learning operation according to the fifth embodiment of the present invention.

FIG. 6 is a flowchart explaining a learning operation according to a fifth embodiment of the present invention. The fifth embodiment relates to a servo system having a learning function of updating an initial learning value, which is measured and stored in the flash memory 11A when a disk drive is measured, during the learning operation. In other words, the fourth embodiment is directed to a method of updating the initial learning value every fixed time period, whereas the fifth embodiment is directed to a method of updating the initial learning value during the learning operation. The learning operation of the fifth embodiment will now be described specifically with reference to the flowchart shown in FIG. 6.

When the spindle motor 3 starts and reaches a given number of stationary revolutions, the CPU 10 sets a learning cylinder as a target position and drives the actuator 4 to perform a seek operation (steps S70 and S71).

When the actuator 4 arrives at the learning cylinder, the CPU 10 selects a first-learning head 2 (whose head number HN is defined as 0) (step S72). The CPU 10 reads an initial learning value (PL) corresponding to the head (head number HN=0) from the flash memory 11A and sets it in a working memory of the RAM 11B (step S73). The CPU 10 performs a learning operation corresponding to the selected head (head number HN=0) using the initial learning value and calculates a learning value (LV) at the present time (step S74).

The CPU 10 determines whether the calculated learning value (LV) is proper or not (whether the learning operation succeeds or not) (step S75). When the learning operation fails, the CPU 10 stores the initial learning value (PL) in the RAM 11A as an alternative to the present-time learning value (NO in step S75, S80). When the learning operation succeeds, the CPU 10 stores the calculated learning value (LV) in the RAM 11A (YES in step S75, S76).

The CPU 10 compares the learning value (LV) and the initial learning value (PL) to determine whether a difference between the values is not higher than a specified value (within tolerance or out of tolerance) (step S77). If a determination result falls within tolerance, the CPU 10 determines that the initial learning value (PL) is proper even at the present time and maintains the initial learning value stored in the flash memory 11A. On the other hand, if the determination result goes out of tolerance, the CPU 10 determines that the initial learning value (PL) is improper and updates it (step S78). More specifically, the CPU 10 rewrites the learning value (LV) calculated at the present time as a new initial learning value (PL) stored in the flash memory 11A.

The above learning operation is performed for all the heads (two heads in this embodiment) mounted on the drive (steps S79 and S81). Thus, the present learning value (including the initial learning value) of each of the heads is stored in the RAM 11B. One of the initial learning values of the heads stored in the flash memory 11A, which is determined as an improper value, is updated by a learning value calculated by the learning operation.

According to the fifth embodiment described above, the CPU determines whether the initial learning value (PL) is valid or not by comparing the present-time learning value (LV) calculated by the learning operation and the initial learning value (PL) when the learning operation is performed when the disk starts to rotate. If a determination result goes out of tolerance and the initial learning value is not valid, the initial learning value is updated using the present-time learning value (LV). Consequently, the initial learning value set at the time of manufacture can always be maintained as a proper initial learning value. In the case where the learning operation, which is performed when the disk starts to rotate, fails, an initial learning value, which is close to a learning value that can be assumed at the present time, can be used as an alternative, servo compensation can reliably be achieved. In other words, a situation in which the drive is troubled due to the use of an inappropriate initial learning value can be prevented. The initial learning value is used as an initial value during the learning operation; therefore, if the initial learning value is an updated appropriate one, time for performing the learning operation can be shortened, as can be time for preparing the read/write operation when the drive starts to operate.

(Sixth Embodiment)

Figure 7:
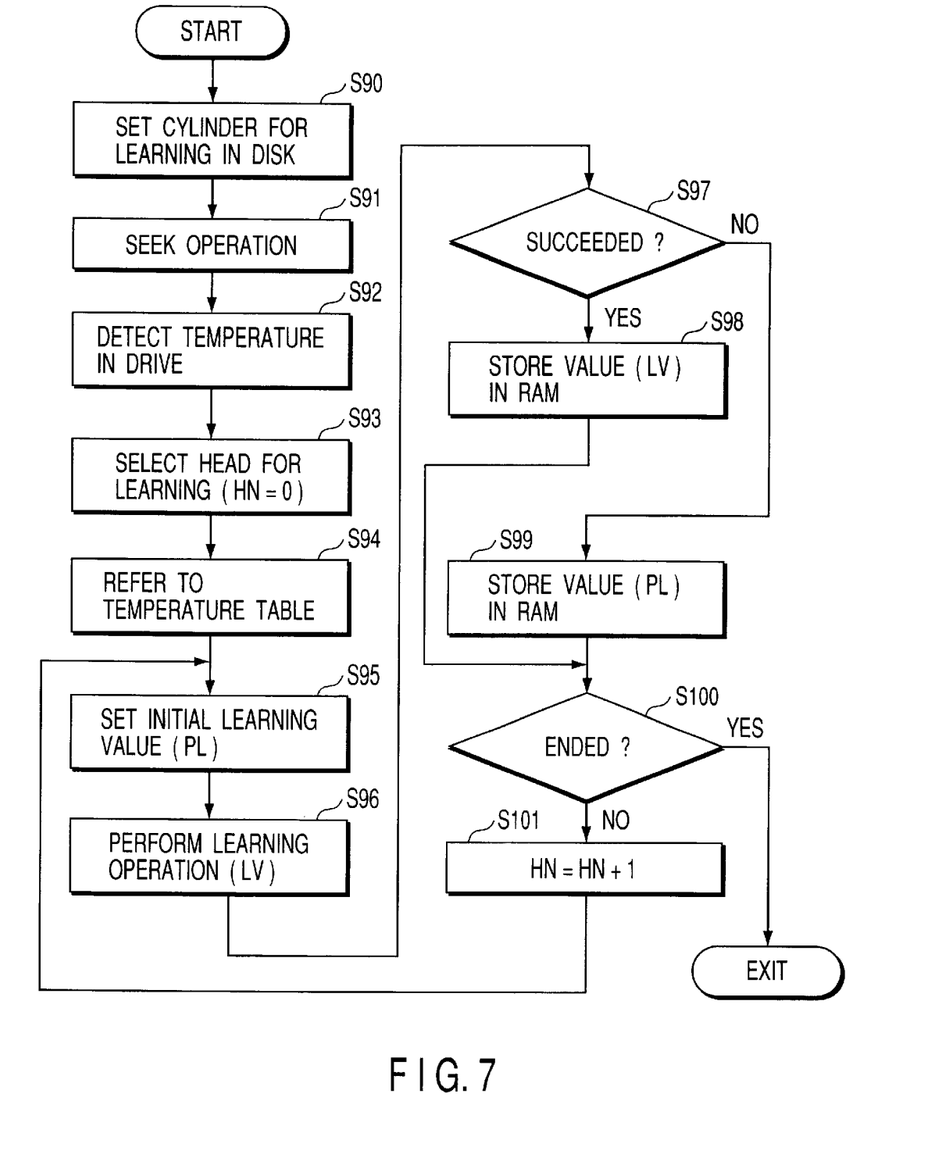
FIG. 7 is a flowchart explaining steps of a learning operation according to the sixth embodiment of the present invention.

FIG. 7 is a flowchart explaining a learning operation according to a sixth embodiment of the present invention. The sixth embodiment relates to a servo system capable of achieving servo compensation by storing a proper learning value in the RAM 11A even when disk runout occurs due to variations in internal temperatures of a disk drive. The learning operation of the sixth embodiment will now be described specifically with reference to the flowchart shown in FIG. 7.

In the sixth embodiment, as shown in FIG. 1, a temperature sensor 12 is provided in the disk drive, and the CPU 10 has a function of receiving a temperature-sensing value from the temperature sensor 12 and monitoring variations in internal temperatures. The flash memory 11A stores a temperature-by-temperature table showing initial learning values of heads measured at respective temperatures. Referring to the table, the CPU 10 can retrieve the initial learning value of each head corresponding to the temperature sensed by the temperature sensor 12.

When the spindle motor 3 starts and reaches a given number of stationary revolutions, the CPU 10 sets a learning cylinder as a target position and drives the actuator 4 to perform a seek operation (steps S90 and S91). Then, the CPU 10 receives a temperature sensing value from the temperature sensor 12 and stores a temperature value, which is obtained at the present time (during the learning operation), in a working memory of the RAM 11B (step S92).

The CPU 10 selects a first-learning head 2 (whose head number HN is defined as 0) and starts a learning operation (step S93). Referring to the temperature-by-temperature table corresponding to the sensed temperature value, the CPU 10 reads an initial learning value (PL) corresponding to the head (head number HN=0) from the flash memory 11A and sets it in a working memory of the RAM 11B (steps S94, S95). The initial learning value (PL) is one corresponding to the temperature of the drive at the present time. The CPU 10 performs a learning operation corresponding to the selected head (head number HN=0) using the initial learning value and calculates a learning value at the present time (step S96).

The CPU 10 determines whether the calculated learning value is proper or not (whether the learning operation succeeds or not) (step S97). When the learning operation succeeds, the CPU 10 stores the calculated learning value in the RAM 11B (YES in step S97, S98). The above learning operation is repeated for all the heads (two heads in this embodiment) (steps S100 and S101).

When the learning operation fails, the CPU 10 stores the initial learning value in the RAM 11B as a learning value corresponding to the head (head number HN=0) (NO in step S97, S99). There is a case where both the present-time learning value calculated by the learning operation and the initial learning value calculated at the time of manufacture are mixed and stored in the RAM 11B as a learning value of each of the heads.

According to the foregoing embodiment, prior to the learning operation performed when the disk starts to rotate, the internal temperature of the drive is sensed and the initial learning value corresponding to the sensed temperature is retrieved from the temperature-by-temperature table. It is thus possible to set an initial learning value proper to the present temperature. Using such an initial learning value for the learning operation, a learning operation adapted to the current temperature can be performed.

In other words, time for performing the learning operation can be shortened and so can be time for preparing the read/write operation. When the learning operation fails and the initial learning value is used as an alternative to the present learning value, the initial learning value proper to the present-time temperature can be used; therefore, servo compensation can reliably be achieved.

(Modification)

In the normal learning operation, a learning value (disk runout component) is calculated by Fourier-expanding a positional error obtained through a positional-error operation using servo burst data when a tracking operation is performed. The basic expression for calculating the learning value (LN: N-th order component) is $LN = K(\alpha \sin A + \beta \cos B)$.

It can be confirmed experimentally that an effective value is set for the coefficient K of the basic expression for every range of temperatures. More specifically, "K1" is effective when temperature is not higher than 10 degrees. "K2" is effective at normal temperatures and "K3" is effective when temperature is not lower than 50 degrees. As a modification to the above sixth embodiment, the temperature-by-temperature table including the initial learning values corresponding to temperatures can be replaced with a structure for storing coefficients Kn of respective temperatures (within given ranges) in the flash memory 11A and obtaining an initial learning value of each temperature from the coefficients Kn and the basic expression.

In each of the embodiments, it is assumed that an initial learning value of each head is stored in the flash memory 11A. The present invention is not limited to this. The initial learning value can be stored for each head and for each location on a disk (specifically for each zone having a given number of tracks as a unit). It is also assumed that the initial learning value is stored in the flash memory 11A when the drive is manufactured. The present invention is not limited to this. The initial learning value can be stored after the drive is shipped. It is however desirable that the initial learning value be stored in the flash memory 11A before the power of the drive turns on and the spindle motor starts.

Furthermore, the coefficient Kn of each temperature (each range) as well as the initial learning value of each head and each location can be stored in the flash memory 11A to obtain an initial learning value of each temperature from the coefficient Kn and the basic expression.

According to the present invention described above in detail, first, time required for performing a learning operation when a disk drive starts can be shortened; accordingly, time required for preparing a read/write operation can be shortened. Secondly, an improper initial learning value can be prevented from being used as an alternative to the present learning value. Consequently, a situation in which a drive is troubled due to the use of an improper initial learning value can be prevented, and servo compensation can always be achieved with reliability.

In short, the servo system included in the drive of the present invention determines whether a learning control means performs a learning operation when the drive (spindle motor) starts and inhibits the learning operation from being performed if an initial learning value is valid. The learning control means moves a head to a given target position (a designated track for learning) to carry out a tracking operation using the initial learning value. When the head is located in the target position by the tracking operation (when the tracking operation succeeds), the learning control means determines that the initial learning value is valid.

Consequently, when the initial learning value is valid, the learning operation performed when the drive starts is omitted. Time for performing the learning operation can be saved and thus time for starting the drive (time for preparing the read/write operation) can be shortened. When the learning control means determines that the initial learning value is valid, the learning operation is stopped and the initial learning value is used for the subsequent servo control operation. On the other hand, when an amount of eccentricity is changed over tolerance due to a change of environment, the learning control means determines that the initial learning value is invalid and the learning operation is carried out. Since a proper learning value is always used, a situation in which the drive is troubled in preparing a read/write operation due to the use of an improper initial learning value can be prevented.

The servo system included in the drive of the present invention has a function capable of appropriately updating an initial learning value measured and stored in a nonvolatile memory when the drive is manufactured. If a learning operation, which is performed when the drive starts, fails, a valid initial learning value adapted to the current state can be used as an alternative. The use of an initial learning value differing from a state in which an amount of eccentricity of a disk is changed after the disk is manufactured, prevents a situation in which the drive malfunctions to cause trouble in preparing a read/write operation. Since, furthermore, an appropriately-updated initial learning value is used as an initial value in the learning operation, time required for the learning operation can be shortened.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
a disk including a track containing a servo area on which servo data is prerecorded;
a head configured to read/write data from/to said disk;
an actuator mounted with said head and configured to locate said head in a target position on said disk;
a servo controller configured to perform a servo control operation for driving said actuator and locating said head in the target position on said disk;
a memory configured to store an initial learning value for determining a servo compensation value required when the servo control operation is performed; and
a learning controller configured to determine whether the initial learning value is valid and inhibit a learning operation from being performed when the initial learning value is valid as a determination result, the learning controller causing said servo controller to perform a servo control operation when the disk drive starts, and determining that the initial learning value is valid when a tracking operation succeeds by servo compensation using the initial learning value.

2. The disk drive according to claim 1, wherein said learning controller performs a learning operation when the initial learning value is invalid as a determination result, and stores a learning value calculated by the learning operation in said memory.

3. The disk drive according to claim 2, wherein said servo controller calculates the servo compensation value using the initial learning value stored in said memory and the learning value calculated by the learning operation, the servo compensation value being used in a seek operation and a tracking operation both included in the servo control operation when the tracking operation is performed.

4. The disk drive according to claim 2, further comprising a second memory different from said memory that is defined as a first memory, said first memory including a nonvolatile flash memory configured to store the initial learning value, and said second memory including a read/write memory configures to store the learning value calculated by the learning operation.

5. The disk drive according to claim 1, wherein the learning controller determines validity of the learning value calculated by the learning operation, and performs the learning operation again when the learning value is invalid and stores a learning value calculated by performing the learning operation again in said memory.

6. A disk drive comprising:
a disk including a track containing a servo area on which servo data is prerecorded;
a head configured to read/write data from/to said disk;
an actuator mounted with said head and configured to locate said head in a target position on said disk;

a servo controller configured to perform a servo control operation for driving said actuator and locating said head in the target position on said disk;

a first memory configured to store an initial learning value for determining a servo compensation value required when the servo control operation is performed;

a second memory which differs from said first memory and to which said servo controller refers; and a learning controller configured to calculate a learning value by performing a learning operation when the disk drive starts, the learning controller storing the initial learning value in said second memory when the initial learning value is valid, and storing the learning value calculated by the learning operation in said second memory when the initial learning value is invalid.

7. The disk drive according to claim 6, wherein said servo controller calculates the servo compensation value using the initial learning value stored in said second memory and the learning value calculated by the learning operation, the servo compensation value being used in a seek operation and a tracking operation both included in the servo control operation when the tracking operation is performed.

8. The disk drive according to claim 6, wherein said first memory includes a nonvolatile flash memory, and said second memory includes a read/write memory using as a working memory of said servo controller.

9. A disk drive comprising:

a disk including a track containing a servo area on which servo data is prerecorded;

a head configured to read/write data from/to said disk;

an actuator mounted with said head and configured to locate said head in a target position on said disk;

a servo controller configured to perform a servo control operation for driving said actuator and locating said head in the target position on said disk;

a temperature sensor configured to sense an internal temperature of the disk drive;

a first memory configured to store an initial learning value for determining a servo compensation value required when the servo control operation is performed;

a second memory which differs from said first memory and to which said servo controller refers; and a learning controller configured to retrieve an initial learning value corresponding to the internal temperature sensed by said temperature sensor from said first memory, perform a learning operation using the initial learning value, and store a learning value calculated by the learning operation in said second memory, said learning controller storing the initial learning value retrieved from said first memory in said second memory when a present learning value calculated by the learning operation is invalid.

10. The disk drive according to claim 9, wherein said servo controller calculates the servo compensation value using one of the present learning value and the initial learning value stored in said second memory, the servo compensation value being used in a seek operation and a tracking operation both included in the servo control operation when the tracking operation is performed.

11. A disk drive comprising:

a disk including a track containing a servo area on which servo data is prerecorded;

a head configured to read/write data from/to said disk;

an actuator mounted with said head and configured to locate said head in a target position on said disk;

a servo controller configured to perform a servo control operation for driving said actuator and locating said head in the target position on said disk;

a temperature sensor configured to sense an internal temperature of the disk drive;

a first memory configured to store an initial learning value for determining a servo compensation value required when the servo control operation is performed;

a second memory which differs from said first memory and to which said servo controller refers; and a learning controller configured to retrieve an initial learning value corresponding to the internal temperature sensed by said temperature sensor from said first memory, perform a learning operation using the initial learning value, and store a learning value calculated by the learning operation in said second memory;

wherein said first memory stores a temperature coefficient that is set for each pre-calculated initial learning value and each predetermined temperature range, and said learning controller retrieves a temperature coefficient corresponding to the internal temperature sensed by said temperature sensor from said first memory and determines an initial learning value corresponding to the internal temperature using the temperature coefficient.

* * * * *